United States Patent
Fitzner et al.

(10) Patent No.: US 7,610,125 B2
(45) Date of Patent: Oct. 27, 2009

(54) METHOD AND DEVICE FOR OPTIMIZING OPERATING PARAMETERS OF AN AGRICULTURAL WORKING MACHINE

(75) Inventors: Werner Fitzner, Warendorf (DE); Heinz-Hermann Wippersteg, Buende (DE); Willi Behnke, Steinhagen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 257 days.

(21) Appl. No.: 11/473,897

(22) Filed: Jun. 23, 2006

(65) Prior Publication Data
US 2007/0005209 A1   Jan. 4, 2007

(30) Foreign Application Priority Data
Jul. 4, 2005   (DE)   ........................ 10 2005 031 426

(51) Int. Cl.
*G01C 22/00* (2006.01)
(52) U.S. Cl. .......................................... 701/24; 701/50
(58) Field of Classification Search ................ 701/50, 701/24, 25, 33
See application file for complete search history.

(56) References Cited

U.S. PATENT DOCUMENTS

| | | | |
|---|---|---|---|
| 5,712,782 A * | 1/1998 | Weigelt et al. | ................ 701/50 |
| 6,726,559 B2 * | 4/2004 | Bischoff | ........................ 460/1 |
| 2004/0186597 A1 | 9/2004 | Wippersteg et al. | |
| 2005/0104737 A1 | 5/2005 | Woodward | |

FOREIGN PATENT DOCUMENTS

| | | |
|---|---|---|
| DE | 103 06 726 | 9/2004 |
| DE | 103 29 932 | 3/2005 |

* cited by examiner

*Primary Examiner*—Mark Hellner
(74) *Attorney, Agent, or Firm*—Michael J. Striker

(57) ABSTRACT

In a method and a device for carrying out the method to optimize operating parameters of an agricultural working machine, an optimization program map being assigned to each adjustable operating parameter in a memory unit, optimization program map A being subdivided into sub-program maps, and the task of optimizing the sub-program maps being transmitted to individual agricultural working machines; in this manner, by dividing up the work to be carried out, the time required to find the optimum operating parameters of an agricultural working machine can be reduced considerably.

23 Claims, 2 Drawing Sheets

METHOD AND DEVICE FOR OPTIMIZING OPERATING PARAMETERS OF AN AGRICULTURAL WORKING MACHINE

CROSS-REFERENCE TO A RELATED APPLICATION

The invention described and claimed hereinbelow is also described in German Patent Application DE 10 2005 031 426.0 filed on Jul. 4, 2005. This German Patent Application, whose subject matter is incorporated here by reference, provides the basis for a claim of priority of invention under 35 U.S.C. 119(a)-(d).

BACKGROUND OF THE INVENTION

The present invention relates to a method and a device for optimizing operating parameters of an agricultural working machine.

Making adjustments to an agricultural working machine is a very complex task, due in part to the fact that a large number of machine components are involved, each of which has operating parameters that the operator must adjust. In the case of a combine harvester, these operating parameters are, e.g., the cylinder speed, blower speed, the sieve widths of the lower and upper sieves, the reel speed, ground speed, etc.

A large number of systems has been disclosed in the related art that support the operator of an agricultural working machine in his task of finding the optimum operating parameter settings. A system is made known, e.g., in DE 103 29 932 A1, which enables a rapid and, therefore, efficient procedure for optimizing operating parameters. According to this procedure, operating parameters that can be changed in a specific manner are compared, and a distinctive operator behavior is derived via a large number of agricultural working machines, thereby making it possible to access optimized operating parameter settings with consideration for special harvesting conditions, the optimized parameters settings having already been confirmed as the optimum operating parameter setting in a large number of actual cases and not just in one specific case. To make it possible for operators of other agricultural working machines to refer to this operator behavior, the determined operating parameters are stored, together with internal and external basic conditions, in relational data records and transmitted to a data base system, it then being possible to call up the distinctive operator behavior from a large number of agricultural working machines using an input and display unit.

A system of this type has the disadvantage, however, that it is very time-intensive and the operators' behavior depends on the experience of the particular operators of the agricultural working machines. The operators of the agricultural working machines are often not experts in the particular field, which means they usually do not have any specialized experience or even any experience at all. Incorrect machine settings and, therefore, poor working results, can therefore result, even when a certain type of operator behavior is distinctive.

To increase the quality of the optimization process, the operator can refer to his own experience, manufacturers' recommendations, preselectable standard settings installed when the agricultural working machine is first delivered, and to sensor-generated machine information. When it comes to changing a plurality of operating parameters, in particular, the operator's level of experience plays a decisive role in determining whether he assigns the effect which occurred to the correct operating parameter. In practice, a procedure of this type means the operator must try out a large number of machine settings before he has found what he assumes to be an optimum setting for the machine, with the number of attempts increasing the less experience a particular operator has. While optimizing the operating parameters, the operator must also process a large amount of additional information. Making matters even more difficult is the fact that the external harvesting conditions are different every time harvesting is performed.

An optimization method is made known in DE 103 06 726 A1, according to which adjustable operating parameters are optimized by applying a process algorithm stored in a data processing system, by way of which the optimization of the adjustable operating parameters is decoupled from the level of experience of the operator of the agricultural working machine to the greatest extent possible. A great deal of time is required, however, to work through individual operating parameter settings and find the optimum machine setting.

SUMMARY OF THE INVENTION

The present invention is therefore based on the object of providing a method and a device for optimizing operating parameters of an agricultural working machine that prevents the described disadvantages of the related art and makes possible a rapid and, therefore, efficient optimization procedure for finding optimum operating parameters of an agricultural working machine.

In keeping with these objects and with others which will become apparent hereinafter, one feature of the present invention resides, briefly stated, in a method for optimizing operating parameters of an agricultural working machine, comprising the steps of assigning at least one optimization program map to each operating parameter in a memory unit; subdividing the optimization program map into sub-program maps; and transmitting the optimization to the sub-program maps of individual agricultural working machines.

Another feature of the present invention resides, briefly stated, in a device for optimizing operating parameters of agricultural working machine, comprising means for assigning at least one optimization program map to each operating parameter; at least one input for network agricultural working machines; a display unit for generating operating parameters optimized in a sub-program maps; a data transmission system for transmitting the optimized operating parameters; a central database to which the optimized operating parameters are transmitted via said data transmission system, said central database being configured so as to generate, based on said operating parameters a statistically optimum operating parameter for a particular optimizing program map; and means for manually or automatically calling up the statistically optimum operating parameters using said data transmission system from said input and said display unit in the network agricultural working machines.

Due to the fact that optimization program map A is subdivided into sub-program maps A(i) and the task of optimizing the sub-program maps A(i) is transmitted to the individual agricultural working machines, a method is created that is suited to greatly reducing the amount of time required to find the optimum operating parameters for an agricultural working machine, due to the fact that the task of optimizing the operating parameters is distributed among individual agricultural working machines.

In order to determine the individual optimized operating parameters as rapidly and efficiently as possible, particular optimization program map A can be a curve or a family of curves, at least one portion of a curve being advantageously assigned to each agricultural working machine as sub-program map A(i) to be optimized.

An advantageous refinement of the method according to the present invention is attained when the optimization of the operating parameters in the sub-program maps A(i) is monitored and a statistically optimum operating parameter is determined. This has the advantage that it allows optimum operating parameters to be found that are based on a statistically reinforced claim.

In a further embodiment of the present invention, a new statistically optimum operating parameter is always determined when at least one operating parameter selected in sub-program maps A(i) is changed by at least one operator. This has the advantage that operating parameters that are always up to date, adapted to the working conditions and statistically optimum are made available to the operators of the agricultural working machines. This also contributes to a further reduction in the amount of time required for optimization.

To prevent an overreaction to the automatic determination of the statistically optimum operating parameters from occurring when subtle or short-term changes are made to the operating parameters selected in the sub-program maps A(i), a new statistically optimum operating parameter is preferably not determined until the operating parameter currently selected by the operator in a sub-program map A(i) differs from a certain threshold value and/or a certain time frame of the currently-selected operating parameter.

Due to the fact that the statistically optimum operating parameters are made available simultaneously for all networked working machines, the situation can be prevented in which the individual agricultural working machines are driven for a long period of time with poor working machine settings, and better start settings can be identified for additional agricultural working machines that are added to the network.

This particularly efficient procedure for performing adjustments on a working machine is achieved when a large number of working machines collaborate to optimize a large number of optimization program maps A by optimizing their particular sub-program maps A(i). This has the advantage, in particular, that, due to the large number of values that are determined, extreme values can be disregarded in the process of finding more error-free working machine settings.

The quality of the optimization in the individual sub-program maps A(i) can also be improved when operators who are qualified to operate the agricultural working machine adjust the parameter settings to optimize the sub-program maps A(i).

To optimize the working machine setting, it makes sense to perform the optimizations in the sub-program maps A(i) as a function of internal and external basic conditions. Advantageously, the internal basic conditions are specific parameters of the agricultural working machine itself, and the external basic conditions are, e.g., weather-specific, geographical and crop material-specific data.

A particularly advantageous embodiment of the present invention results when the determination of the statistically optimum parameters also includes the determination of tendencies of the operators of individual agricultural working machines to adjust the individual operating parameters, so that, since the operators of the agricultural working machines know the incorrect adjustment direction, they can perform optimization in the correct direction, i.e., in the direction of increasing or decreasing the particular operating parameter, without their having to spend a lot of time to test them out.

In an advantageous refinement of the present invention, the individual working machines are networked with each other via at least one data transmission system, so that, by means of permanent data exchange between the individual agricultural working machines and/or a central data base, it is possible to find the statistically optimum operating parameters.

A particularly user-friendly application results when the operator of an agricultural working machine can call up the statistically optimum operating parameters as a function of relevant internal and external basic conditions.

In a further advantageous refinement of the present invention, the generation of the statistically optimum operating parameters takes place in a centralized or decentralized manner, depending on the specific case. If, e.g, the optimization of specific operating parameters should be carried out between networked agricultural working machines that work under basically the same or similar working conditions and in close proximity to one another, as is often the case with "machine fleets" in agricultural applications, it is advantageous to limit the generation of statistically optimum operating parameters to this networked group of machines and to agricultural working machines that are added to this networked group of machines.

It is advantageous, in particular, that the statistically optimum operating parameters determined in this networked group of machines are already tuned much more precisely to the actual application, thereby making it possible to further reduce the optimization time of the agricultural working machines networked with each other in this group of machines. This also enables a better start setting for agricultural working machines subsequently added to this group of machines.

An improvement of this user-friendliness can also be attained by automatically applying the determined statistically optimum operating parameters of the agricultural working machine on the relevant working units.

Due to the fact that the individual operators evaluate the statistically optimum operating parameters made available to them as a function of their overall working machine setting, and the best evaluations are made available to the other networked agricultural working machines so that their working machine settings can be adjusted, an even better optimization of the working machine setting of the individual networked agricultural working machines can be attained.

To keep the costs to operate the method according to the present invention low, it is provided in an advantageous refinement of the present invention to utilize globally and locally limited data transmission systems which are known per se, e.g., the Internet, radio networks, mobile telephone networks, or memory cards.

A device—having a particularly simple design—for carrying out the method according to the present invention results when the networked agricultural working machines include at least one input and display unit for generating the operating parameters optimized in the sub-program maps A(i), and these optimized operating parameters are transmitted via a data transmission system to a central data base, the central data base generating—based on these selected operating parameters for the particular optimizing program map A—the statistically optimum operating parameter to be used in the adjustment of the agricultural working machine, it being possible to manually or automatically call up the statistically optimum operating parameter using the data transmission system from the input and display unit in the networked agricultural working machines.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The method for optimizing operating parameters is described in greater detail with reference to an agricultural application and FIGS. 1 and 2. It should be expressly pointed out that the method according to the present invention is not limited to adjusting the working units described here, nor is it limited to combine harvesters. Instead, it can be used for agricultural working machines with adjustable working parameters.

Figure 1:
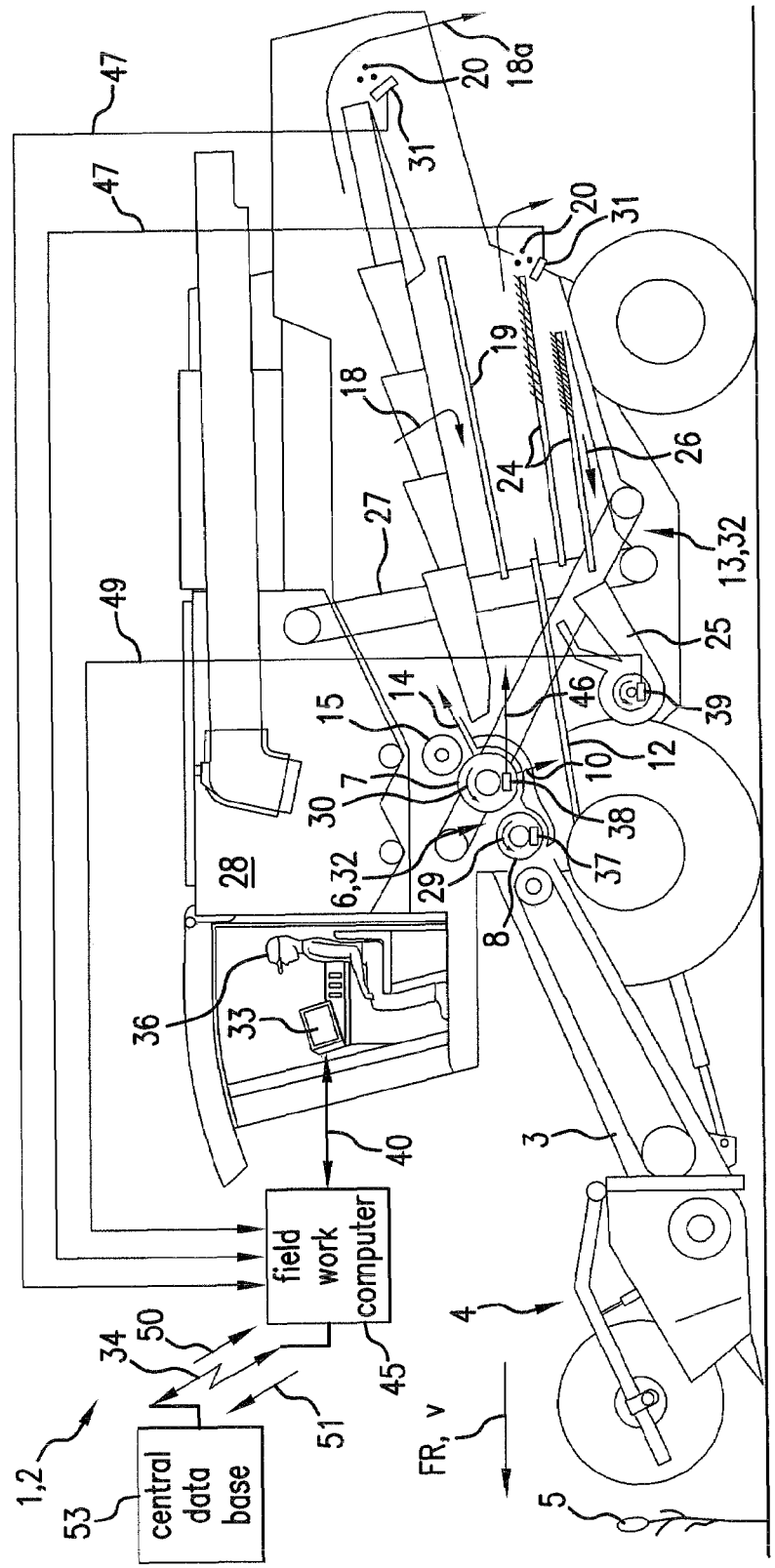
FIG. 1 shows an agricultural working machine in the form of a schematic side view of a combine harvester.

FIG. 1 shows an agricultural working machine 1 designed as a combine harvester 2 which includes a header 4 located on a feed rake 3 in its front region pointing in the direction of travel FR, header 4 harvesting and bunching up crop material 5. Via feed rake 3, crops 5 are transferred in a known manner to threshing devices 6 which, in this exemplary embodiment, are composed of a first cylinder 7 and a second, downstream cylinder 8. It is within the scope of the present invention for threshing devices 6 to be configured in a manner known per se as "axial threshing rotors" and "separating rotors". In the region of threshing devices 6, a first stream of crop material 10 consisting mainly of grain, short straw and chaff is separated at concave 9, first stream of crop material 10 reaching cleaning unit 13 via a grain pan 12.

A further stream of crop material 14 is transferred in the rear region of threshing devices 6 via an impeller 15 to a separating device 16 designed as a tray-type shaker 17. On tray-type shaker 17, a further stream of crop material 18 consisting mainly of grain, straw and chaff is also transferred via a return pan 19 and grain pan 12 to cleaning unit 13. In addition, a stream of material 18a consisting mainly of straw and, to a small extent, of grain—the losses due to cleaning 20—is discharged out of combine harvester 2 at the end of tray-type shaker 17. Crop material 5 is conveyed along a concave 9 into the rear region of threshing devices 6 by the rotary motion 10, 11 of cylinders 7, 8 and downstream impeller 15.

Flow of crop material 5 is divided into various streams of crop material 10, 14. Stream of crop material 10 separated by concave 9 consists mainly of grain, and stream of crop material 14 which is discharged in the rear region of threshing part 7 consists mainly of straw. Once streams of crop material 10, 14 exiting threshing parts 6 have passed through further working units, e.g., a cleaning unit 13 composed of one or more sieve levels 24 and a blower 25 assigned to these sieve levels 24, and a separating device designed as tray-type shaker 17, grain flows 26, which are now substantially free of admixtures, are directed via a feed device 27 to a storage device 28 located on combine harvester 2.

To determine grain loss 20, grain-loss sensors 31, which are known per se, are assigned to separating device 16 designed as tray-type shaker 17 and cleaning device 13, each of which is located in the rear region. It should also be mentioned here that a large number of additional sensors, such as speed sensors 37, 38 for determining the rotational speed of cylinders 7, 8 that are threshing devices 6, and for determining the speed of blower 25, can be assigned to combine harvester 2.

In the exemplary embodiment shown, threshing devices 6, separating device 16 and cleaning unit 13 are the working units 32 of combine harvester 2. The particular actuators used to adjust combine harvester 2 are adequately known to one skilled in the art, so the particular elements are not depicted in FIG. 1. In addition, combine harvester 2 is equipped with an input and display unit 33, and it is networked with further (not shown) agricultural working machines 1 and/or a central data base 53 via a data transmission system 34 known per se, e.g., the Internet, radio network, mobile telephone network or memory cards.

It is the objective of operators 36 of agricultural working machines 1 of this type to keep grain loss 20 to a minimum. In a known manner and to this end, combine harvester 2 can be equipped with grain-loss sensors 31 and, if necessary, with additional sensors 31, 37, 38 which, in the simplest case, are configured—as mentioned above—as speed sensors 37, 38 for determining the speed of blower 25 and cylinders 7, 8. It is also already known to use throughput sensors, which are not described in greater detail here. Signals 46, 47, 49 generated by various sensors 31, 37, 38 are converted in a fieldwork computer 45 located in combine harvester 2 into, e.g., cylinder speed signals 46, grain-loss signals 47 and blower speed signals 49, which are then displayed to operator 36 on input and display unit 33 either permanently or only when called up. It is also known to use grain-loss sensors 31 to separately determine the losses from individual working units 32 such as cleaning unit 13 or separating unit 16, rather than grain losses 20.

It is also known from the related art to display the portion of damaged grain in the stream of grain which has been harvested and will not be described in greater detail, and to display this information to operator 36. Fieldwork computer 45 can also receive information 50 from external systems or transmit information 51 to external systems. It is also known from the related art to decouple the optimization of actual operating parameters from the level of experience of operator 36 to the greatest extent possible by applying a process algorithm (which is not described in greater detail) stored in a data processing system (which is not described in greater detail) and entering setpoint value data, e.g., limiting values for grain loss 20 and damaged grain.

With methods of this type, the optimization of adjustable operating parameters is limited to operator 36 being able to change individual operating parameters of working units 6, 13, 17 or ground speed v and, based on the determined grain losses 20 or the amount of damaged grain, operator 36 estimates their influence on the working quality of agricultural working machine 1 and, if the results are not satisfactory, he changes the adjustable operating parameters until an acceptable working result of combine harvester 2 is attained, or the operating parameters are optimized independently of the operator, which takes a great deal of time. This is where the method according to the present invention for optimizing the operating parameters comes into play.

Figure 2:
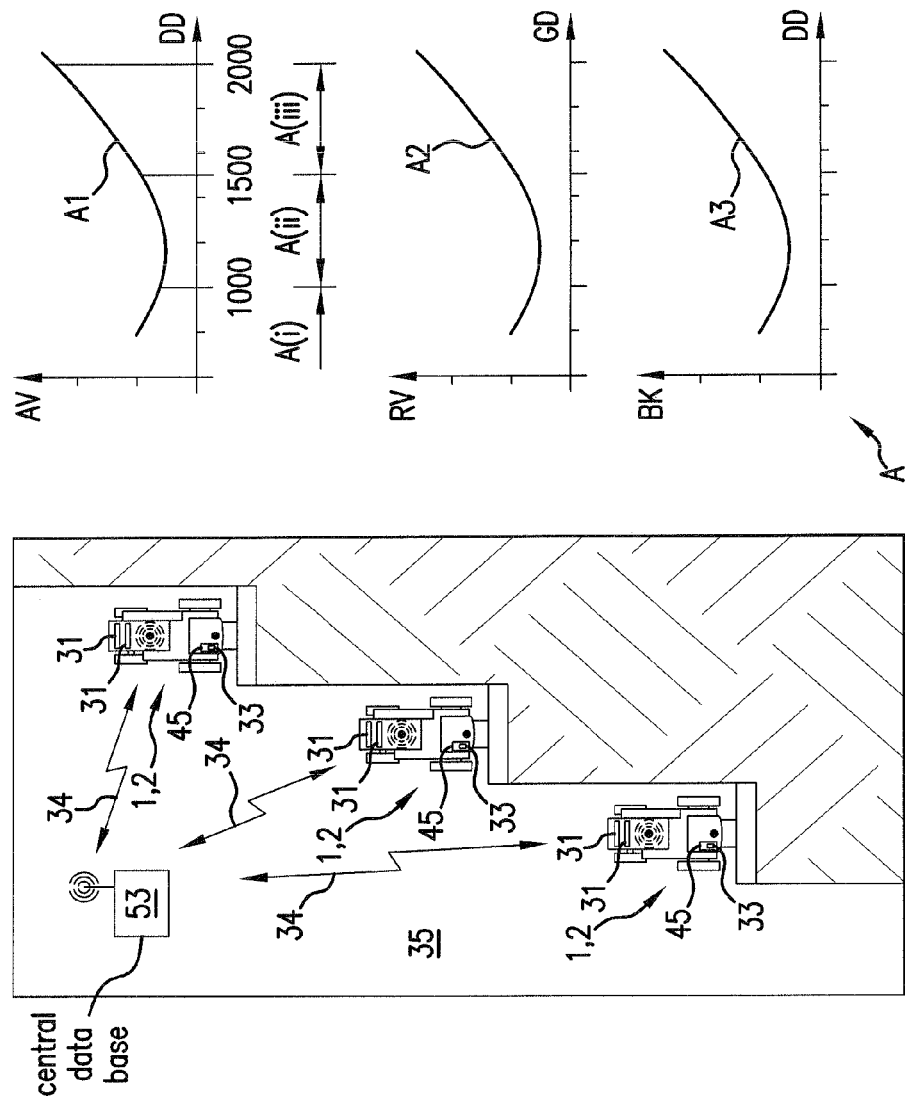
FIG. 2 shows three agricultural working machines during a harvesting operation on the field of crops, and an optimization program map A with three curves A1 through A3.

FIG. 2 shows, as examples, three agricultural working machines 1 in the form of combine harvesters 2, each of which is equipped with grain-loss sensors 31 known per se for determining grain loss 20, combine harvesters 2 performing a harvesting operation on field of crops 35. FIG. 2 also shows an optimization program map A—which will be optimized by agricultural working machines 1—with three curves A1 through A3. Individual agricultural working machines 1 and a central data base 53 are networked with each other via a data transmission system 34, e.g., the Internet or radio. Networked agricultural working machines 1 also include a fieldwork computer 45 to be used in the optimization process.

According to the present invention, optimization program maps A are assigned to individual adjustable operating parameters. In the exemplary embodiment shown, optimization program map A is composed, as an example, of curves A1 through A3, which are known per se. In a manner known per se, one of the networked agricultural working machines 1 optimizes the adjustments of the working machines with reference to one of the curves A1 through A3 as a function of internal and external basic conditions known per se, while crop material throughput remains constant. Simultaneously, fieldwork computer 45 also processes position data received, e.g., by a GPS receiver. A networked agricultural working machine 1 optimizes its machine setting with reference to grain loss/cylinder speed curve A1; this curve shows how the grain loss—in the form of non-threshed ears—behaves relative to the cylinder speed. A further networked agricultural working machine 1 optimizes its machine setting based on grain loss/blower speed curve A2, which describes the relationship between grain loss in the cleaning unit and the blower speed of blower 25 assigned to the cleaning unit. A further networked agricultural working machine 1 optimizes the speed of cylinders 7, 8 with reference to damaged grain/cylinder speed curve A3, which describes the dependency of the portion of damaged grain on cylinder speed.

As an alternative, optimizing program map A is composed of a curve A1. In the exemplary embodiment shown, a portion of grain loss/cylinder speed curve A1 is transmitted, as sub-program maps A(i) through A(iii) to each agricultural working machine 1 for optimization. For example, the cylinder speed range is composed of three sub-program maps, A(i) (speed range between 0 and 1000 rpm), A(ii) (speed range between 1000 and 1500 rpm), A(iii) (speed range between 1500 and 2000 rpm). Each of the networked agricultural working machines 1 optimizes the working machine setting, in a manner known per se, in the speed range assigned to it. It is within the scope of the present invention for further curves A2, A3 to also be subdivided into sub-program maps A(i), similar to curve A1.

The operating parameters resulting from the data determined for sub-program maps A(i) through A(iii) are displayed in input and display unit 33 to operators 36 of agricultural working machines 1. By way of data transmission system 34, fieldwork computer 45 of particular networked agricultural working machine 1 is engaged in permanent data exchange 40 with a central data base 53 and/or fieldwork computers 45 of the other agricultural working machines 1 in the networked group of machines. The operating parameters determined for particular sub-program map A(i) are transmitted to central data base 53 via data transmission system 34. Based on the individual optimized operating parameters transmitted for particular sub-program map A(i) through A(iii), central data base 53 generates, in a manner known per se, statistically optimum operating parameters for particular optimization program map A, the statistically optimum operating parameters resulting in minimal grain loss 20 and increased ground speed v. It is also feasible for the statistically optimum operating parameters to be determined by one of the networked agricultural working machines 1 using evaluation electronics, which are known per se. The statistically optimum operating parameters are made available to all networked agricultural working machines 1, and they can be called up manually and/or automatically using data transmission system 34.

It is also feasible for the statistically optimum operating parameters to be made available to agricultural working machines 1 subsequently added to the networked group of machines to ensure better start settings. If, however, the objective is to optimize the adjustment of agricultural working machines 1 working in a bounded, regional territory, it is possible for the statistically optimum operating parameters to be determined by only one of these agricultural working machines 1.

To prevent an overreaction to the automatic determination of the statistically optimum operating parameters from occurring when subtle or short-term changes are made to the operating parameters selected in the particular sub-program maps A(i) through A(iii), a new statistically optimum operating parameter is not determined until an operating parameter selected by at least one operator 36 in the particular sub-program map A(i) through A(iii) is changed. It is also feasible to make the determination of a new statistically optimum operating parameter dependent on whether the currently selected statistically optimum operating parameter differs from a certain threshold value and/or a certain time frame. This approach would also shorten the process for optimizing the adjustable operating parameters of particular agricultural working machine 1.

To ensure that the statistically optimum operating parameters determined for optimization program maps A are of high quality, central data base 53 ideally processes only those optimized operating parameters transmitted for individual sub-program maps A(i) through A(iii) that were generated by operators 36 who are qualified to operate agricultural working machine 1. In an advantageous refinement of the present invention, when a large number of agricultural working machines 1 collaborate on the optimization process, the tendencies of the particular operators 36 of individual agricultural working machines to make adjustments to find the optimum operating parameters are determined and are communicated to operators 36 of networked agricultural working machines 1, and extreme values are disregarded in the process of finding more error-free working machine settings.

The possibilities for manually and/or automatically implementing the statistically optimum operating parameters determined according to the present invention in actuators which serve as control signals for adjusting working units 6, 13, 17 are adequately known to one skilled in the art, are within the scope of the present invention, and are encompassed therein. It is also feasible for individual operators 36 to evaluate the statistically optimum operating parameters made available to them as a function of their overall working machine setting, and to make the best evaluations available to the other networked agricultural working machines 1 so that their working machine settings can be adjusted.

It is within the scope of abilities of one skilled in the art to transform the method described for optimizing operating parameters of an agricultural working machine 1 in a manner not described, or to use it in applications other than those shown here, to obtain the effects described. It is also within the scope of the present invention to optimize ground speed v with reference to constant operating parameters.

It will be understood that each of the elements described above, or two or more together, may also find a useful application in other types of methods and constructions differing from the types described above.

While the invention has been illustrated and described as embodied in a method and device for optimizing operating parameters of an agricultural working machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method for optimizing operating parameters of an agricultural working machine, comprising the steps of:
   assigning at least one optimization program map to each operating parameter in a memory unit;
   subdividing the optimization program map into sub-program maps;
   transmitting the sub-program maps to individual working machines;
   optimizing the sub-program maps by the individual working machines;
   monitoring the optimization of the operating parameters in the sub-program maps; and
   determining a statically optimum operating parameter.

2. A method as defined in claim 1; and further comprising forming the optimization program map as a curve; and optimizing a portion of the curve being transmitted as a sub-program map to each agricultural working machine.

3. A method as defined in claim 1; and further comprising forming the optimization program map as a family of curves; and optimizing a curve or portions of the curve being transmitted as a sub-program map to each agricultural working machine.

4. A method as defined in claim 1; and further comprising determining a new statically optimum operating parameter every time an operating parameter selected in the sub-program maps is changed by at least one operator.

5. A method as defined in claim 1; and further comprising carrying out a determination of a new statistically optimum operating parameter as the function of a parameter selected from the group consisting of a threshold value, a time, and both.

6. A method as defined in claim 1; and further comprising making available a statically optimum operating parameter of the particular optimization program map to all of network agricultural working machines.

7. A method as defined in claim 1; and further comprising collaborating a large number of agricultural working machines to optimize a large number of optimization program maps by optimizing particular sub-program maps.

8. A method as defined in claim 1; and further comprising carrying out the optimization of the sub-program maps by operators who are qualified to operate the agricultural working machines.

9. A method as defined in claim 1; and further comprising carrying out the optimization of the sub-program maps by operators of agricultural machine as a function of conditions selected from the group consisting of internal basic conditions, external basic conditions, and both.

10. A method as defined in claim 9; and further comprising selecting the internal basic conditions as specific operating parameters of the agricultural working machines.

11. A method as defined in claim 9; and further comprising selecting the external basic conditions as data selected from the group consisting of weather-specific data, geographical data, and crop material-specific data.

12. A method as defined in claim 1; and further comprising including in a determination of a statistically optimum operating parameter for a particular optimization program map, a determination of tendencies of operator's individual agricultural working machines to make adjustments to find the optimum operating parameters; and notifying the operators of the individual working machines of these tendencies to make adjustments.

13. A method as defined in claim 1; and further comprising networking the individual agricultural working machines to each other via at least one data transmission system.

14. A method as defined in claim 1; and further comprising calling up statistically optimum operating parameters of the particular optimization program maps as a function of relevant internal and external basic conditions.

15. A method as defined in claim 1; and further comprising generating statistically optimum operating parameters centrally, for accessing for all networked agricultural working machines said centrally generated, statistically optimum operating parameters.

16. A method as defined in claim 1; and further comprising generating statistically optimum operating parameters decentrally, for accessing only a selected portion of all networked agricultural working machines, to axis said decentrally generated, statistically optimum operating parameters.

17. A method as defined in claim 1; and further comprising adjusting a working machine setting by an operator of the agricultural working machine, based on a determination of statistically optimum operating parameters.

18. A method as defined in claim 1; and further comprising carrying out adjustment of a working machine setting automatically on the agricultural working machine.

19. A method as defined in claim 1; and further comprising evaluating by an operator, statistically optimum operating parameters made available to him with respect to an overall adjustment of the working machine.

20. A method as defined in claim 1; and further comprising, based on evaluations performed by an operator adjusting by the operator a working machine setting of another network agricultural working machine.

21. A method as defined in claim 1; and further comprising carrying out adjusting of a working machine setting automatically of on another agricultural working machine.

22. A method as defined in claim 1; and further comprising using a data transmission system as a globally limited data transmission system.

23. A method as defined in claim 1; and further comprising using a data transmission system as a locally limited data transmission system.

* * * * *